(No Model.)

F. J. MAIER.
SPRING BED AND BINDER THEREFOR.

No. 427,777. Patented May 13, 1890.

Inventor
Franz J. Maier,
By Attorney

UNITED STATES PATENT OFFICE.

FRANZ J. MAIER, OF TRENTON, NEW JERSEY.

SPRING-BED AND BINDER THEREFOR.

SPECIFICATION forming part of Letters Patent No. 427,777, dated May 13, 1890.

Application filed August 24, 1888. Serial No. 283,692. (No model.)

*To all whom it may concern:*

Be it known that I, FRANZ J. MAIER, a citizen of the United States, residing at Trenton, in the county of Mercer and State of New Jersey, have invented certain new and useful Improvements in Spring-Beds and Binders Therefor; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to facilitate the operation of uniting or joining the upper or outer spirals of the vertical springs of a bed or mattress, to secure an elastic yet firm and secure union, to bring a broad bearing on said spirals, so that the strain will be distributed more equally, and to reduce the cost of manufacture.

The invention consists in the improved spring bed or mattress and in the arrangements and combinations of parts thereof, substantially as will be hereinafter set forth, and finally embodied in the clauses of the claim.

Figure 1:
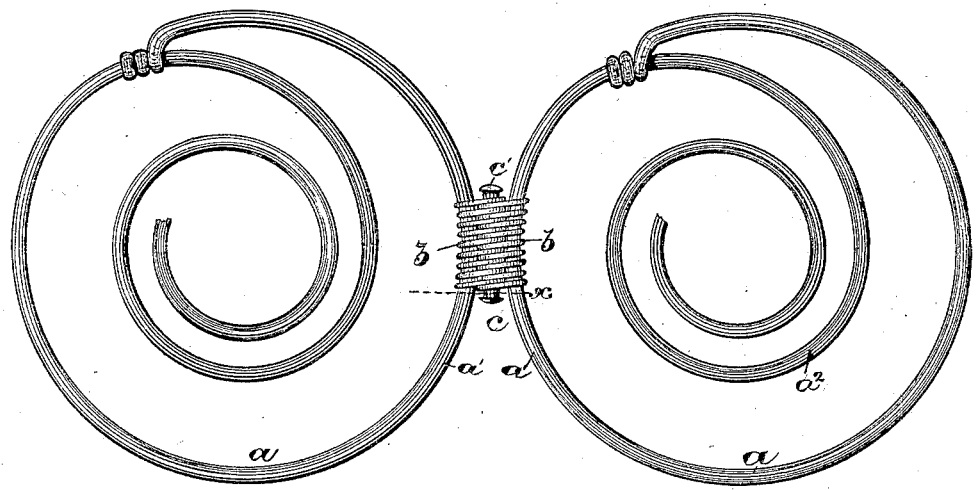
Figures 2, 3, 4:
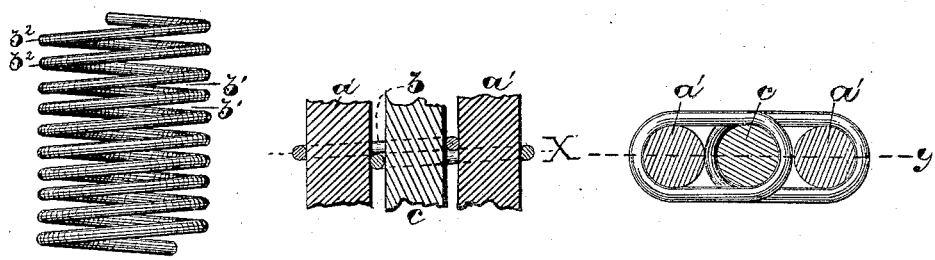

Referring to the accompanying drawings, in which like letters of reference indicate corresponding parts in each of the several figures, Figure 1 is a plan indicating a portion of a spring bed or mattress, two springs thereof being shown having the improved joining parts. Fig. 2 is a detail plan of a single flattened spiral. Fig. 3 is a sectional view taken on line X, and Fig. 4 is a sectional view taken on line Y, Fig. 3.

In said drawings, $a\ a$ indicate the usual vertical springs which take the weight of or support the sleeper, of which $a'\ a'$ are the upper end spirals, which are ordinarily larger than the intermediate spirals $a^2$.

$b\ b$ indicate flattened ferrules, which are made of spiral wire. Said ferrules are interlaid, as shown in Fig. 1, the ends $b^2$ of one ferrule passing into the recesses or openings $b'$ of the co-operating spirals, so that the individual spirals of the said ferrules overlap and alternate with one another, as shown in Fig. 3, and form a key-passage, through which the key $c$ passes to lock the said ferrules together. Before being thus locked, however, the said spiral ferrules are disposed on their respective end spirals of the springs $a\ a$. Being thus disposed and united by the key $c$, the said springs $a\ a$ are securely held together and a certain peculiar elasticity is allowed to the end spirals which is not common in the use of the flat fastening devices heretofore provided; but the springs $a\ a$ are not given the freedom of movement to or from one another such as is allowed where the said springs are connected by springs—in the manner illustrated, for example, by the device described and shown in Patent No. 315,546. The key $c$ is held in the key-passage by being provided with suitable heads $c'$, Fig. 1.

Having thus described the invention, what I claim as new is—

1. In a spring bed or mattress, the combination, with the springs $a\ a$, of fasteners consisting of wire ferrules, the ends $b^2\ b^2$ of which overlap and alternate and form a key-passage, and a key extending through said passage and holding said fasteners together, substantially as and for the purposes set forth.

2. The improved fastener for bed-springs, &c., consisting of spirals $b\ b$, interlaid so that the individual spirals overlap to form a key-passage, and a key, said parts being arranged and combined substantially as and for the purposes set forth.

In testimony that I claim the foregoing I have hereunto set my hand this 10th day of May, 1888.

F. J. MAIER.

Witnesses:
CHARLES H. PELL,
E. L. SHERMAN.